United States Patent [19]

Lavarenne

[11] 3,714,642

[45] Jan. 30, 1973

[54] DEVICE FOR DETECTING THE SPEEDS OF MOVING BODIES

[75] Inventor: Jean Lavarenne, Villecresnes, France

[73] Assignee: Societe Nationale Industrielle Aerospatiale, Paris, France

[22] Filed: Nov. 13, 1970

[21] Appl. No.: 89,393

[30] Foreign Application Priority Data

Nov. 15, 1969 France..................................6939376

[52] U.S. Cl...............340/263, 340/38 R, 340/309.1, 340/309.4, 317/141, 324/180
[51] Int. Cl............................................G08b 21/00
[58] Field of Search.........340/25, 27 SS, 38 R, 263, 309.1,
340/309.4; 324/178, 180; 246/108; 346/107 VP; 317/141

[56] References Cited

UNITED STATES PATENTS 2,623,163   12/1952   Bone et al. ...........................340/263
2,619,402   11/1952   McCutcheon.......................324/180
2,635,692    4/1953   Scheske..............................324/178
2,347,194    4/1944   Holliday.........................346/197 VP Primary Examiner—Donald J. Yusko
Assistant Examiner—Robert J. Mooney
Attorney—Karl W. Flocks

[57] ABSTRACT

A device arranged on the ground for detecting the speeds of moving bodies running or moving on the surface of the ground.

It comprises two detectors which control, where actuated by the passage of the moving body, switches. Each of these latter opens simultaneously two circuits, at least one of which controls a time-delay system. The remaining two circuits, previously connected in series with each other and with the controlled time-delay system, form the utilization circuit in an open or closed condition which is a function of the state of the circuits of switching and time delay system, at the moment when the second detector is actuated.

4 Claims, 5 Drawing Figures

DEVICE FOR DETECTING THE SPEEDS OF MOVING BODIES

The invention relates to the detection of the speed of moving bodies by devices which are not mounted on board the said bodies.

It relates more particularly to the identification in steps of the speed of these moving bodies over pre-determined ranges. It is more especially directed to moving bodies of the running type such as for example aircraft running on the ground, automobile vehicles, or again to vehicles on cushions of air, fixed to the physical guiding track. It also permits the detection of speeds of moving bodies in both directions of movement along a given track.

In known devices of this kind, expecially those of the Radar type with a single detector, the estimation of the mean speed of movement of the moving body is effected by the Doppler effect, or alternatively it is deduced from the evaluation of the distance between this moving body and the detector at a given instant, and then from the evaluation of the distance between the moving body and the detector at another instant, separated from the first by a known period of time.

Devices of this kind, necessarily complex by their capital investment, their maintenance and their calibration, supply speed indications of relative accuracy which is more than sufficient when it is possible to locate this speed in pre-determined ranges of speed.

Other devices are also known having two detectors, such as photo-electric devices for example, separated from each other by a known distance, the average speed of movement of the moving body over a certain distance being calculated from the time interval separating the passages of this moving body in front of each detector. Devices of this kind are also complicated and furthermore necessitate a calculation system in order to define the desired speed.

The invention makes it possible to avoid these drawbacks by providing a detection device which is simple, reliable and easy to operate.

The device forming the subject of the invention comprises: a first detection means which controls, by an impulse produced by the passage of the moving body, a first bi-stable switching means which simultaneously opens two circuits, at least one of which controls a time-delay means; a second detection means which controls, by an impulse produced by the passage of the moving body, a second bi-stable switching means simultaneously opening two circuits, one of which controls the said time-delay means while the two other circuits of the said switching means, previously connected in series with each other and with the controlled time-delay circuit, form a utilization circuit in an open or closed condition which is a function of the state of the circuits of the said switching and time-delay means at the moment when the second impulse is produced.

According to the invention, the utilization circuit may permit the passage of a detection signal for the speed of the moving body effectively associated with the distance of separation of the detection means and of the duration of the delay of the time-delay means concerned, in accordance with $V = d/t$.

The application of the device according to the invention may be particularly useful in the determination of the speed of an aircraft at a given point while running on the ground, for example.

In such an application, it is in fact possible to define in a very sure and simple manner, for example by means of two pneumatic tubes crossing the runway and terminating at a unit containing two transmitters, three time-lag relays and two bi-stable relays, a light alarm signal "speed less than a fixed limit," after having previously introduced, of course, a "limit speed" reference quantity into the device.

Similarly, it is possible to obtain information which is as close as may be desired, of the speed of the aircraft, the treatment of which is easy for the control of writing machines for recording (tests on prototypes or aeroport control systems) or alternatively of stop barriers (automatic lifting, regulation of braking as a function of successive speeds detected after engagement in the net).

In another application for supervising the speed of automobile vehicles (road traffic) it is possible in a similar manner to trip hooters combined or not with illuminated reminder panels and a photographic recorder for registering excessive speed, independently of the use made of information obtained on the counting of vehicles and their speeds.

In a different utilization for a vehicle on an air cushion guided on a physical track, it is possible to supply, for both directions of running of the vehicle, a speed indication transmitted in the form of a light signal and repeated at a central station, for example.

The invention will in any case be more clearly understood from the remainder of this text, in which there are described, by way of non-limitative examples, with reference to the accompanying drawings, two preferred forms of embodiment of the invention, one with a pneumatic detector and the other with a mechanical detector.

Figure 1:
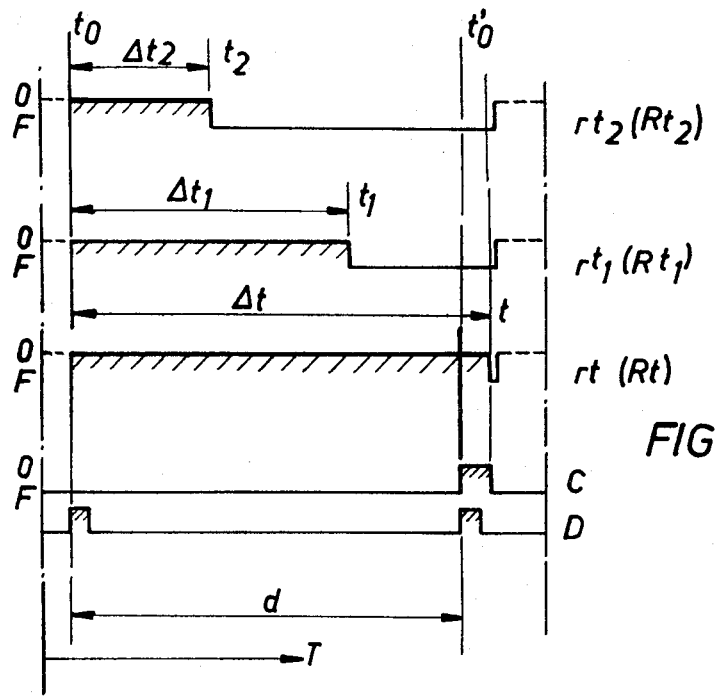
FIG. 1 is a diagram showing the various sequences employed in the device according to the invention.

The diagram of FIG. 1 shows by way of example, in a case having three time-delay means, the splitting-up of the sequence making it possible to have an open utilization circuit when the second impulse is produced, before the circuit of the longest time-delay means has been closed.

In this diagram there has been shown, in the closed state F and the open state O, the circuits of three time-delay means $rt$, $rt_1$, $rt_2$, and in the closed state F and open state O the utilization circuit C, while the instants $t_0$, $t'_0$ are the detection impulses D at the moment of the passage of the moving body. In addition, the time-delay means $Rt$, $Rt_1$, $Rt_2$ have their circuit $rt$, $rt_1$, $rt_2$ open at rest, open during the time delay, and closed from the end of the time-delay period.

When one of the detection means sends a first impulse at the instant $t_o$ to a bi-stable switching means, the latter releases the time delay $\Delta t$, $\Delta t_1$, $\Delta t_2$ of the time-delay means $Rt$, $Rt_1$, $Rt_2$. At the end of the time-delay period, the circuit of the time-delay means will be closed at the successive instants $t$, $t_1$, $t_2$, but the utilization circuit C may be located inside one of the time-delay ranges $\Delta t$, $\Delta t_1$ or $\Delta t_2$ as soon as the second impulse $t'_o$ appears, sent by the second detection means. In the example chosen for the diagram of FIG. 1, the impulse which appeared at the instant $t'_o$ was located in the range of time delay $\Delta t - \Delta t_1$, which has the effect, by an appropriate discrimination of the time-delay circuits, of establishing a utilization circuit $t$ dependent on the time-delay means selected, which is $Rt$ in the present case.

Figure 2:
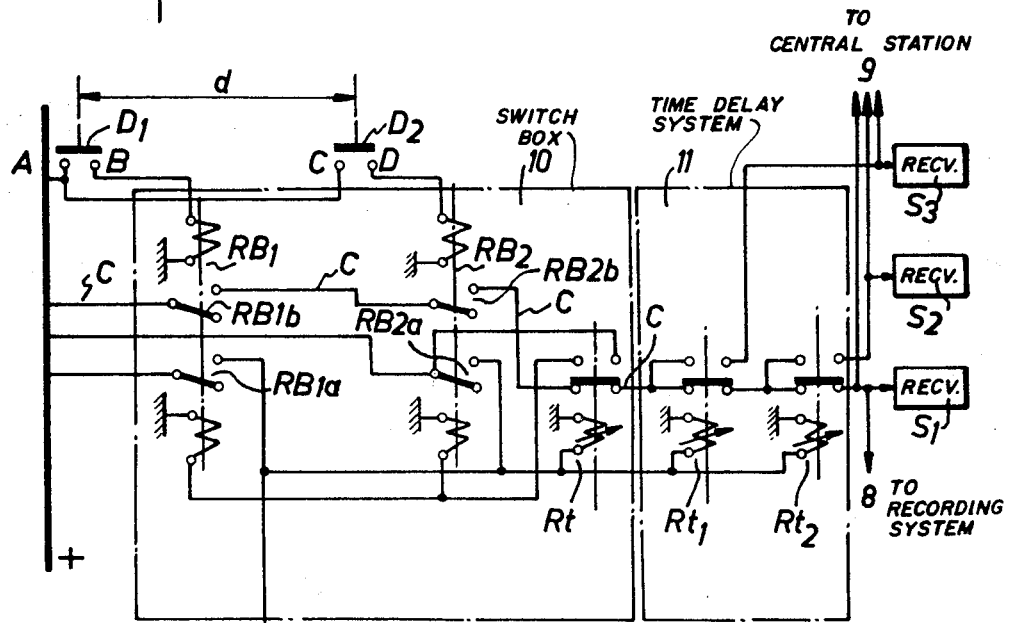
FIG. 2 is a diagram showing the arrangement of the various means and circuits in the device according to the invention.

Following a convenient method of explanation given in the form of the electric circuit of FIG. 2, there has been indicated by $D_1$, $D_2$ the contacts of the detection means spaced apart from each other by a distance $d$, by $RB_1$, $RB_2$, the bi-stable relays with two contact sand two circuits, by $Rt$, $Rt_1$, $Rt_2$, the time-delay relays at the closure of the circuit, and by $S_1$, $S_2$, $S_3$, the receivers of the signals delivered from the utilization circuit C.

In this diagram and in the fundamental condition of rest, C is first closed by $RB_{1b}$, $RB_{2b}$. As soon as the first impulse appears at $D_1$ for example, $RB_1$ switches over and starts the time delay of the relays $Rt$, $Rt_1$, $Rt_2$, by $RB_{1a}$, but the circuit C remains closed by $RB_{2b}$ as long as the second impulse has not appeared at $D_2$.

When this second impulse appears, $RB_{2b}$ switches over and opens this circuit C which then no longer depends on the state of time delay of the relays $Rt$, $Rt_1$ or $Rt_2$.

Assuming that the circuits $rt$, $rt_1$, $rt_2$ have all remained open, it is clear that the signal will appear at $S_1$. If $Rt_2$ is closed (by the end of the time-delay period) before the opening by $RB_{2b}$, the circuit C will be shunted by the closed contact of $Rt_2$ and directed on $S_2$. If $Rt_1$ is closed by the end of the time delay, the circuit C will be shunted by the closed contact of $Rt_1$ and directed on $S_3$. If finally $Rt$ is closed by the end of the time delay, the circuit C will be cut-off, indicating by the absence of signal that the impulse $D_2$ has appeared after the longest time-delay period.

The closed condition of the contact of $Rt$ provides, through a branch supply system, a supply to the second coil of the bi-stable relays in order to replace the circuits of $RB_1$ and $RB_2$ in the fundamental closed state. In the same way, the time-lag relays $Rt$, $Rt_1$, $Rt_2$ then return to the fundamental open-circuit position since they are no longer energized from that moment so that the detection device is ready to operate following a fresh cycle.

In this operation, it is obvious that the order of the impulses is indifferent for the detection means. Thus impulses D which are produced in the order $D_2$ followed by $D_1$ or alternatively $D_1$ followed by $D_2$ would lead to the same result. Similarly, the number of time-lag relays is not necessarily limited to three, and the duration of the time-delay periods may have any desired value, equal or unequal, in order to define ranges of speeds which always correspond to the problem to be solved.

In accordance with a first form of embodiment, and in a first alternative form concerning the detection of speeds of an aircraft running on the ground, in order to ensure for example operations such as: indication to the pilot of running speeds, statistical controls of running speeds, placing stop barriers in position at speeds considered too low, regulation of braking after engagement in the stop barrier or control of running speeds of prototypes, there are placed across the runway (see FIG. 4) two tubular pneumatic detectors 1 and 2 spaced apart from each other by a distance $d$ and terminating at transmitters 1A, 2A, which in turn control the detectors $D_1$ and $D_2$.

These detectors which will close precisely at the passage of the wheels 3 over the detectors 1–2, are connected to each other and terminate at a switch box 10 (see FIG. 2) containing the bi-stable relays $RB_1$ and $RB_2$.

It is proposed for example to signal to the pilot that his speed is less than a fixed speed of value $V = 240$ km/hr.

In such a case, and if for example the following values have been adopted: $d = 18$ m., $t = 0.35$ second, $t_1 = 0.28$ second, and $t_2 = 0.21$ second, it is easy to see by reference to the diagram of FIG. 2 and to the above description, that by the actuation of $S_3$ there will be obtained the alarm indication "speed less than 240 km/hr" (time of passage greater than $t_1 = 0.28$ second).

Figure 4:
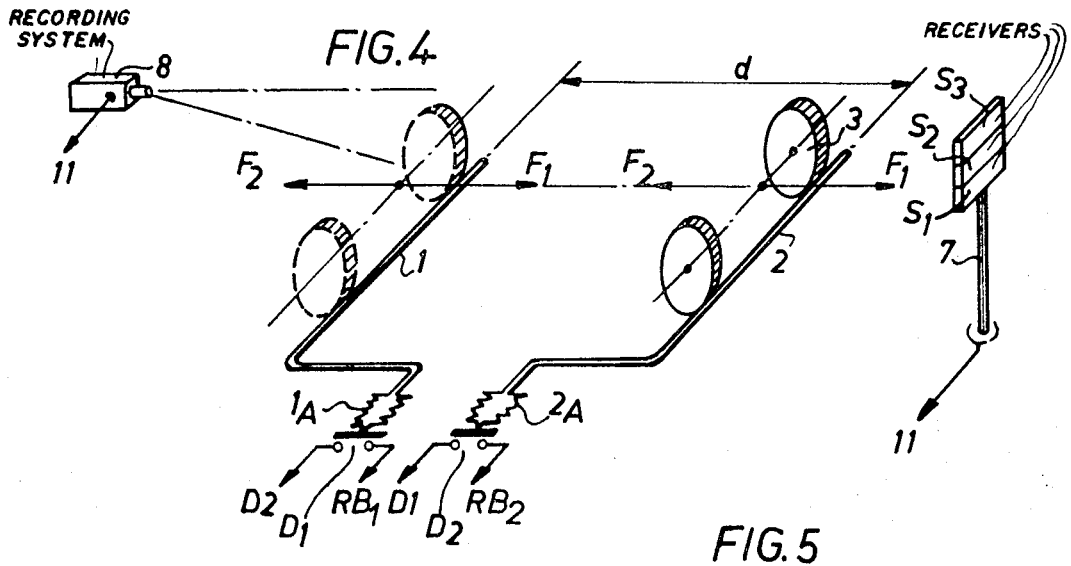
FIG. 4 is a diagrammatic view in perspective, showing the application of the detection device to bodies running on the ground, such as aircraft on the ground or automobile vehicles.

A second alternative, also shown in FIG. 4, concerning the detection of speeds of automobile vehicles, utilizes a similar process in which the time-delay values $\Delta t$, $\Delta t_1$, $\Delta t_2$ have been chosen identically the same and the distance $d$ has been taken equal to 6 meters. This alternative makes it possible to visualize a light panel 7 for indication of speeds and, if so required, permits the release of a recording system 8, of the photographic type for example, enabling the proof to be established of an excessive speed. In such a case, suitable signals will appear, such as for example:

A signal $S_1$ for a speed greater than 100 km/hr (6)/0.21;

A signal $S_2$ for a speed between 100 and 80 km/hr (6)/0.28;

A signal $S_3$ for a speed comprised between 80 and 60 km/hr (6)/0.35

The branch connection 12 may further more constitute the associated means for counting passing vehicles, which may be necessary for the regulation of road traffic.

Figure 5:
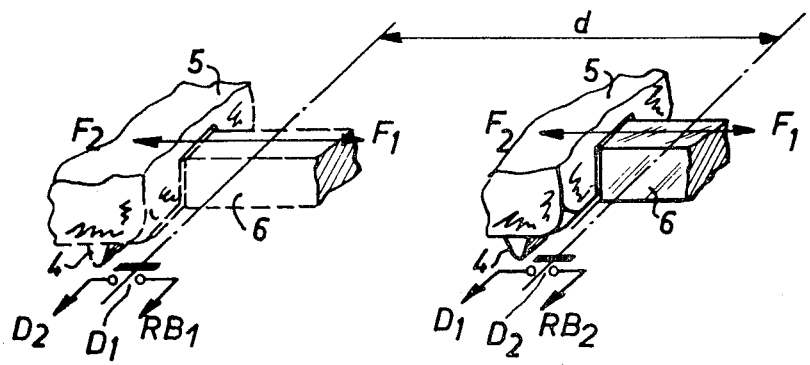
FIG. 5 is a diagrammatic view in perspective showing the application of the detection device to non-rolling bodies in movement, such as vehicles on air cushions on a guiding track for example.

According to a second form of embodiment (see FIG. 5) relating to a moving body 5 which has no wheels, such as a vehicle on a cushion of air guided by a physical track 6 for example, the speed detection process will again be similar when a boss 4 provided on the moving body acts to control the detectors $D_1$ or $D_2$. In such a case, the signal can simultaneously be transmitted to a central station 9 which gives the indication of the speed of passage of the vehicle at a given place, and/or it may be brought to the attention of the driver.

It should be noted that the device according to the invention can operate indifferently in both directions $F_1$ or $F_2$ of movement of the vehicles, the speed of which is to be detected.

Figure 3:
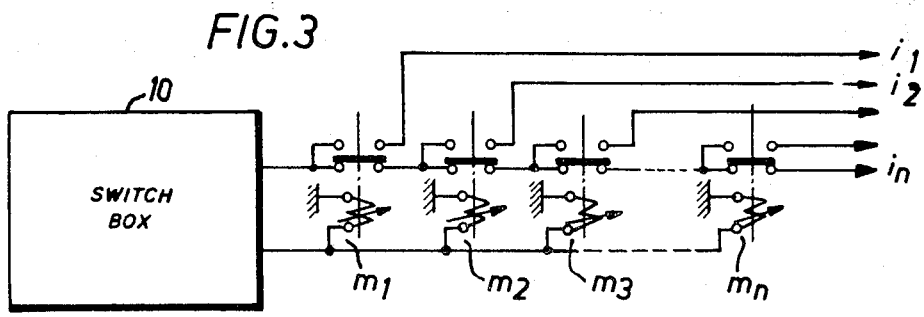
FIG. 3 is a diagram showing a principle utilized for the selection of a single signal of the utilization circuit.

Similarly, and in an alternative form, the signal delivered by the elements of the box 10 of FIG. 2 can be selected in the manner indicated in FIG. 3 so as to provide indications $i_1, i_2 \ldots i_n$ solely dependent on the duration of the time delay and on the number of time-delay means $m_1, m_2, m_3 \ldots m_n$ employed.

The speed-detection device for moving bodies can be applied to all kinds of moving bodies with any means of detection, switching, time delay and indication which may be considered suitable. Similarly, electrical, electronic, fluid, optical or sound means or means employing electro-magnetic waves may be employed in the invention without there by departing from the scope of the said invention.

The invention can conveniently be applied to the forms of embodiment described, but may also be extended to all cases in which the need for a simple detection of the speed of a moving body may prove necessary.

I claim:

1. A speed detection device for moving bodies, not mounted on board the said bodies, comprising
    a first detection means for detecting the passage of a body and producing an impulse produced by the passage of the body,
    at least one time delay means having control and contact portions,
    a first bistable switching means controlled by said first detection means and including two circuit means of which one of said circuit means is connected to operate said control portion of said at least one time delay means,
    a second detection means for detecting the passage of the body and producing an impulse produced by the passage of the body,
    a second bistable switching means controlled by the impulse from said second detection means and including two circuit means of which one of said last mentioned circuit means is connected to operate said control portion of said at least one time delay means,
    a utilization circuit which includes the other of said circuit means of each of said bistable switching means connected in series with each other and with said contact portion of said at least one time delay means and with the closed or open condition of said utilization circuit depending on the state of the circuits of said switching means and time delay means at the instant in which the second of said impulses is produced.

2. A detection device as claimed in claim 1, in which each said bi-stable switching means is constituted by a relay with two coils and two two position contacts.

3. A detection device as claimed in claim 1, in which each said time-delay means is constituted by a relay with one two position contact in the condition with the circuit open at rest, open during time-delay and closed temporarily at the end of the time-delay period.

4. A detection device as claimed in claim 1, in which is provided a plurality of time-delay means with two circuits controlled simultaneously from one of said bi-stable switching means, putting said utilization circuit in series during the time-delay period, in shunt outside the time-delay period and in series at the end of the time-delay period, whereby each information given by said utilization circuit is dependent on the duration of the time-delay of said time-delay means.

* * * * *